United States Patent [19]
Tsuji et al.

[11] Patent Number: 5,369,878
[45] Date of Patent: Dec. 6, 1994

[54] ASSEMBLY APPARATUS FOR ASSEMBLING SUB-ASSEMBLY OF SWASH PLATE TYPE FLUIDIC APPARATUS

[75] Inventors: Kazuhiko Tsuji; Yoshihiro Kawasaki, both of Kariya, Japan

[73] Assignee: Kabushiki Kaisha Toyoda Jidoshokki Seisakusho, Kariya, Japan

[21] Appl. No.: 64,487

[22] Filed: May 19, 1993

[30] Foreign Application Priority Data

May 21, 1992 [JP] Japan .................. 4-128812

[51] Int. Cl.⁵ .............................................. B23P 19/00
[52] U.S. Cl. ...................................... 29/824; 29/823; 29/281.1; 29/281.5
[58] Field of Search .................. 29/823, 824, 771, 784, 29/791, 799, 281.1, 281.5, 890.09, 888.02

[56] References Cited

U.S. PATENT DOCUMENTS

| | | | |
|---|---|---|---|
| 4,662,050 | 5/1987 | Bryce | 29/281.5 |
| 5,088,176 | 2/1992 | Koga | 29/824 |

FOREIGN PATENT DOCUMENTS

54-108008  8/1979  Japan .

*Primary Examiner*—Mark Rosenbaum
*Assistant Examiner*—David P. Bryant
*Attorney, Agent, or Firm*—Brooks Haidt Haffner & Delahunty

[57] ABSTRACT

An assembly apparatus for assembling a sub-assembly of a swash plate type fluidic apparatus includes a holder adapted to hold an end of a driving shaft, a horizontal rail, a curved rail connected with the horizontal rail, a plurality of carriers adapted to seat pistons and a pair of hemispherical shoes as well and to move on the horizontal rail and the curved rail, transporting means adapted to move the carriers on the horizontal rail and the curved rail, a first orienting member adapted to positioned the shoes in spherical seats of the pistons with its surfaces, and a second orienting member disposed connectably with the first orienting member and including surfaces which incline gradually to an inclination angle of a swash plate. The carriers are moved continuously on the horizontal rail and the curved rail by the transporting means. When all of the carriers are placed on the curved rail, the pistons are positioned around an outer peripheral area of the swash plate in a predetermined phaseal relationship, and simultaneously the shoes are guided smoothly between the swash plate and spherical seats of the pistons.

7 Claims, 5 Drawing Sheets

( PRIOR ART )

Fig. 10

( PRIOR ART )

ASSEMBLY APPARATUS FOR ASSEMBLING SUB-ASSEMBLY OF SWASH PLATE TYPE FLUIDIC APPARATUS

BACKGROUND OF THE INVENTION

1. Field of the Invention

The present invention relates to an assembly apparatus for assembling a sub-assembly of a swash plate type fluidic apparatus, such as a compressor, a pump, or the like. In particular, it relates to an assembly apparatus for assembling the sub-assembly in which a plurality of pistons and hemispherical shoes are disposed at predetermined intervals around a swash plate so as to straddle the swash plate which is mounted on a driving shaft.

2. Description of the Prior Art

There are swash plate type fluidic apparatuses. For example, Japanese Unexamined Patent Publication (KOKAI) No. 54-108,008 discloses a swash plate type fluidic apparatus, a double-headed swash plate type compressor for air-conditioning a vehicle. In the compressor, a pair of cylinder blocks are disposed opposingly at the front and the rear, and a swash plate chamber is formed at the connection of the cylinder blocks. The swash plate chamber is communicated with a suction port for a return coolant. The cylinder blocks are enclosed by housings and valve plates at the outer ends, and a suction chamber and a discharge chamber are formed in the housings. The suction chamber and the discharge chamber are communicated with the swash plate chamber. The cylinder blocks are provided with a central shaft hole disposed on a common axis. A driving shaft is inserted into the shaft holes rotatably. A swash plate installed on the driving shaft is accommodated in the swash plate chamber rotatably. Further, the cylinder blocks are provided with a plurality of bores which are disposed parallel around the driving shaft at the front and the rear, and a double-headed piston is inserted into each of the bores reciprocatively. The double-headed pistons are coupled to the swash plate by way of hemispherical shoes. Furthermore, the cylinder blocks are provided with a plurality of suction passages which communicate the swash plate chamber with the suction chambers of the housings, and they are also provided with a discharge passage which communicates the front discharge chamber with the rear discharge chamber.

Figure 10:
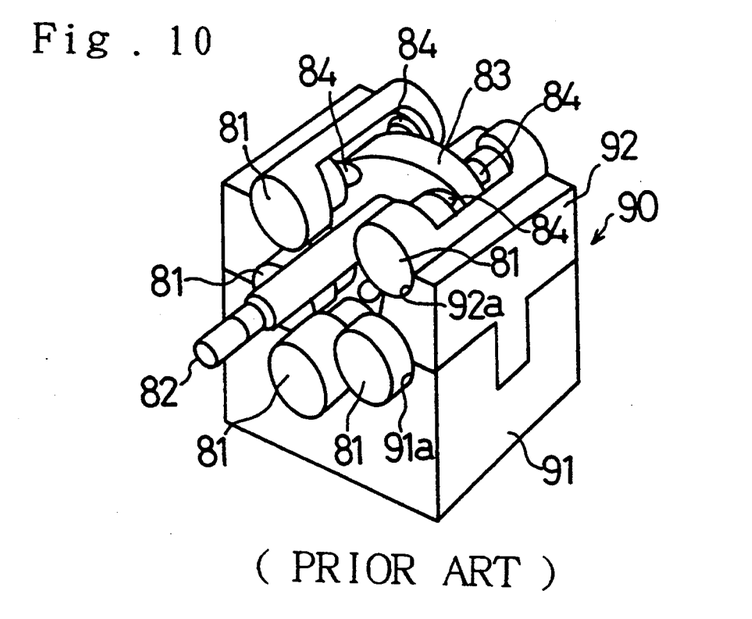
FIG. 10 is a perspective view illustrating the assembly jig required for the conventional manual assembly operation.

When manufacturing the swash plate type fluidic apparatus of this kind, it is required that a sub-assembly be assembled by disposing a plurality of the pistons and the hemispherical shoes around the swash plate at predetermined intervals so as to straddle the swash plate. Such an assembly has been carried out conventionally with an assembly jig 90 as illustrated in FIG. 10. The assembly jig 90 includes a body 91 provided with a concavity 91a which is adapted to place a plurality of pistons 81 in a predetermined circumferentially spaced relationship, and a pair of retractable members 92 which are retractable perpendicularly to the body 91 and provided with a concavity 92a adapted to place the piston 81 similarly. In addition, the body 91 and the retractable members 92 are formed in such configurations that they do not interfere with a swash plate 83 installed on a driving shaft 82 at their central regions.

The assembly operation with the assembly jig 90, for instance, assembling a sub-assembly of a double-headed swash plate type compressor provided with 5 cylinders on each of the sides, is carried out as follows. At first, the following component parts are prepared: the swash plate 83 installed on the driving shaft 82 with a predetermined inclination angle, 5 pairs of the hemispherical shoes 84, and 5 pistons 81 provided with a pair of spherical seats 81a. In the pistons 81, the spherical seats 81a are disposed opposingly, and they are adapted to engage the shoes 84 between themselves and the swash plate 83 when the assembly is completed.

After retracting the retractable members 92 of the assembly jig 90, a set of the piston 81 and the hemispherical shoes 84 is disposed in the lowermost part of the concavity 91a of the body 91, and the driving shaft 82 and the swash plate 83 are disposed in the assembly jig 90 with the swash plate 83 inserted between the shoes 84. Further, two sets of a piston 81 and shoes 84 are disposed in the intermediate parts of the concavity 91a of the body 91 with the swash plate 83 placed between the shoes 84. Then, the retractable members 92 are stood upright. Thereafter, another two sets of a piston 81 and shoes 84 are disposed in the uppermost parts of the concavity 92a of the retractable members 92 with the swash plate 83 placed between the shoes 84. Thus, the sub-assembly of the double-headed swash plate type compressor is completed. Finally, the sub-assembly is inserted into front and rear cylinder blocks (not shown), and it is transferred to the subsequent manufacturing process.

Figure 9:
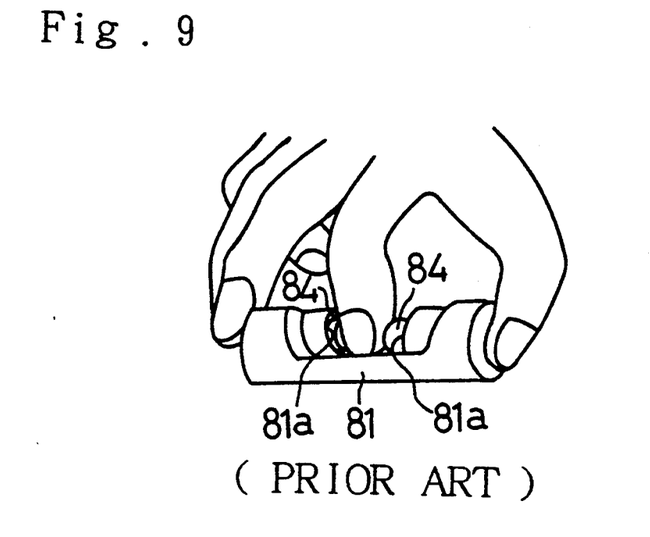
FIG. 9 is a perspective view illustrating the conventional manual assembly operation for assembling the sub-assembly.

However, during the conventional assembly operation, an operator must hold the piston 81 with his hands, and at the same time he must retain the hemispherical shoes 84 in the pair of spherical seats 81a disposed opposingly in the pistons 81 with his fingers as illustrated in FIG. 9. While maintaining these states, he must dispose the five sets of piston 81 and shoes 84 in the assembly jig 91, stand the retractable members 92 upright, and carry out the other required operations. Accordingly, the conventional assembly operation requires quite a skill, and it cannot be carried out quickly so as to shorten the assembly time because it is a manual operation done by an operator.

SUMMARY OF THE INVENTION

The present invention has been developed in view of the conventional manual assembly operation. It is therefore a primary object of the present invention to provide an assembly apparatus which can assemble a sub-assembly of a swash plate type fluidic apparatus automatically.

The primary object can be accomplished according to the present invention by an assembly apparatus for assembling a sub-assembly of a swash plate type fluidic apparatus, wherein the sub-assembly has a plurality of pistons, each including a pair of spaced apart facing spherical seats, and hemispherical shoes placed between said seats disposed at predetermined intervals around a swash plate installed on a driving shaft with the pistons and shoes straddling the swash plate. The assembly apparatus comprises:

a holder adapted to hold a driving shaft with a swash plate mounted thereon;

a horizontally extending track;

a curved track connected with said horizontally extending track and extending circumferentially around an outer peripheral area for surrounding a swash plate which is mounted on a shaft that is held by said holder;

a segmented truck including a plurality of carriers articulately connected to each other and adapted to position at predetermined intervals along said truck individual assemblies of a piston with a pair of said hemispherical shoes, said truck being moveable along said horizontally extending track onto said curved track for positioning said carriers with said pistons and shoes thereon in a predetermined relationship equiangularly spaced circumferentially along said curved track;

transporting means for moving said segmented truck along said track;

a first orienting member disposed for vertical movement between the spherical seats of said pistons when said truck is on said horizontally extending track, said first orienting member having orienting surfaces adapted to position said hemispherical shoes in said spherical seats upon downward movement of said first orienting member; and a second orienting member disposed for connecting with said first orienting member when the latter member has descended, said second orienting member having orienting surfaces that incline gradually from a vertical position to an inclination angle of said swash plate and along which said segmented truck is transported as it moves from said horizontally extending track to said curved track, said second orienting member being adapted to guide said hemispherical shoes into position between said spherical seats of said pistons and said swash plate.

In the present assembly apparatus, the carriers of the segmented truck are adapted to cradle the pistons with a pair of the hemispherical shoes on the segmented truck at predetermined intervals. Accordingly, it is not necessary for an operator to hold the pistons with his hand. Under the circumstance, when the first orienting member is lowered between the spherical seats of the pistons, the shoes are positioned in the spherical seats by the orienting surfaces of the first orienting member. Consequently, it is not necessary for the operator to retain the shoes in the spherical seats with his fingers. With the first orienting member lowered, the transporting means is actuated, and accordingly the carriers of the segmented truck are moved by the transporting means one after another. When the carriers are moved, the shoes are continually held against the spherical seats of the pistons by the orienting surfaces of the first orienting member.

In the meantime, the holder holds the driving shaft and the horizontal track is connected with the curved track which goes around the outer peripheral area of a swash plate installed on the driving shaft. The carriers of the segmented truck are transferred from the horizontal track to the curved track by the transporting means, thereby starting movement on the curved track. While moving on the curved track, the segmented truck follows the curve, thereby disposing the carriers around the swash plate at predetermined intervals. Accordingly, the pistons and the hemispherical shoes cradled on the carriers are positioned in a predetermined spaced equiangular relationship around the outer. peripheral area of the swash plate. Here, note that the second orienting member is connected with the lowered first orienting member, and that it includes the orienting surfaces which incline gradually to an inclination angle of the swash plate. Consequently, when the segmented truck is transferred from the horizontal track to the curved track, the second orienting member guides the shoes smoothly between the spherical seats of the pistons and the swash plate. As a result, the sets of piston and shoes are disposed at predetermined intervals around the swash plate installed on the driving shaft, thereby completing the sub-assembly of the swash plate type fluidic apparatus. Then, the sub-assembly is taken out as follows. The driving shaft of the sub-assembly is released from the holder at one end while taking precautions against falling, and it is pulled out at the other free end. Finally, the sub-assembly is transferred to the subsequent process.

Thus, in accordance with the present assembly apparatus for assembling a sub-assembly of the swash plate type fluidic apparatus, it is unnecessary for the operator to tamper with the sets of piston and hemispherical shoes and to carry out the other required operations while holding the pistons with, his hands, and at the same time retaining the shoes in the spherical seats of the pistons with his fingers.

As having been described so far, the present assembly apparatus is constructed as described heretofore or as recited in the appended claims. Hence, the present assembly apparatus can carry out the assembling operation for the sub-assembly of the swash plate type fluidic apparatus automatically.

As a result, the present assembly apparatus obviates the skill which has been required for the manual assembling operation for the sub-assembly, and it enables to sharply reduce the time required for assembling the sub-assembly. All in all, it can reduce the manufacturing cost of the sub-assembly.

In addition, when the present assembly apparatus is connected with the subsequent processes so as to automate up to the final assembly process, it is possible to construct a fully automated assembly line for the swash plate type fluidic apparatus. Accordingly, such an assembly line can further reduce the overall manufacturing cost of the swash plate type fluidic apparatus.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENT

Having generally described the present invention, a further understanding can be obtained by reference to the specific preferred embodiment which is provided herein for purposes of illustration only and is not intended to limit the scope of the appended claims.

The Preferred Embodiment of the assembly apparatus according to the present invention will be hereinafter described with reference to FIGS. 1 through 8. Since the driving shaft, the swash plate, the hemispherical shoes and the pistons of the swash plate type fluidic apparatus are identical with those used and described for the conventional manual assembly operation with the assembly jig 90, they will be designated and described with the same reference numerals.

Figure 1:
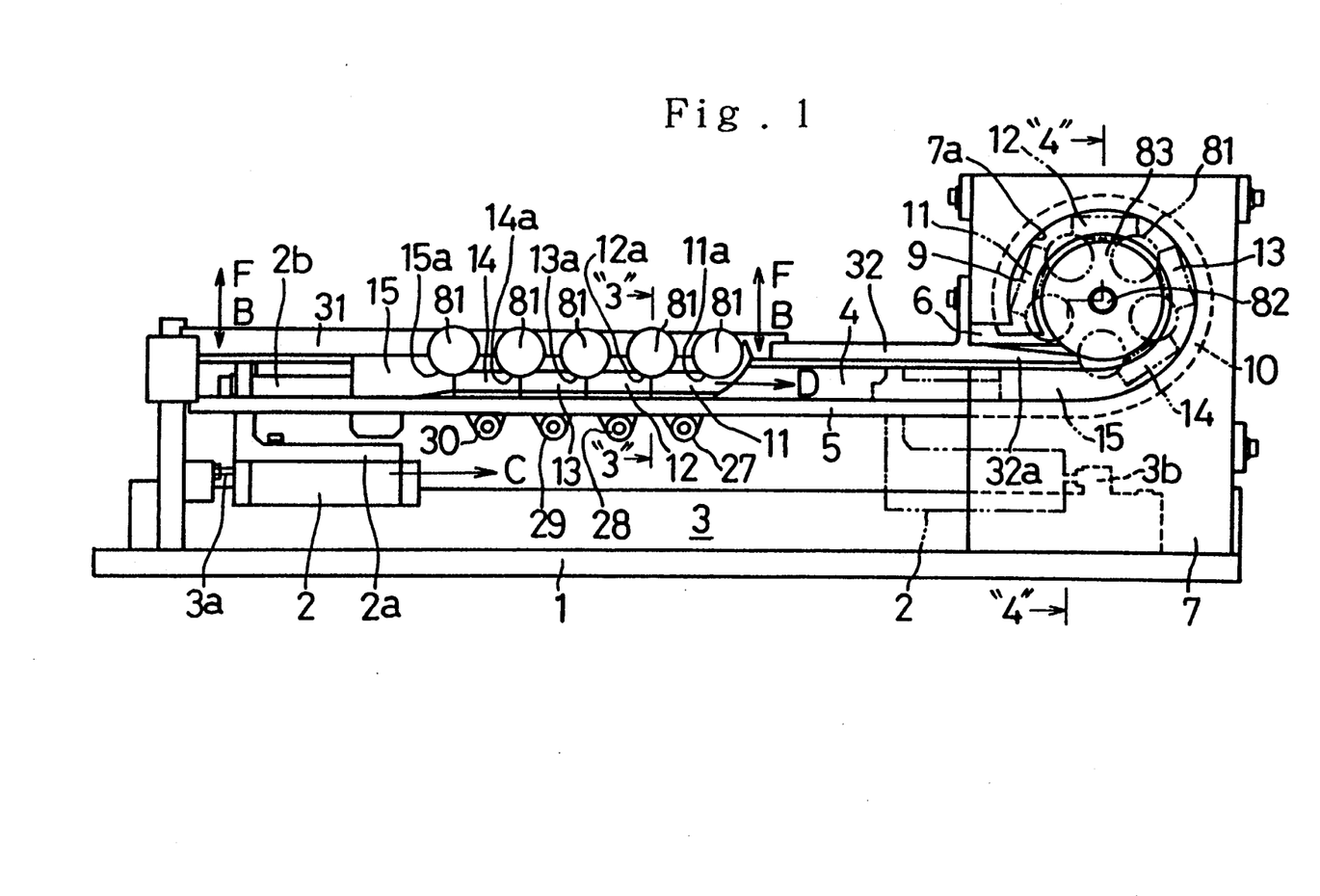
FIG. 1 is a side view of a Preferred Embodiment of the assembly apparatus according to the present invention viewed perpendicularly to the lengthwise direction.
Figure 2:
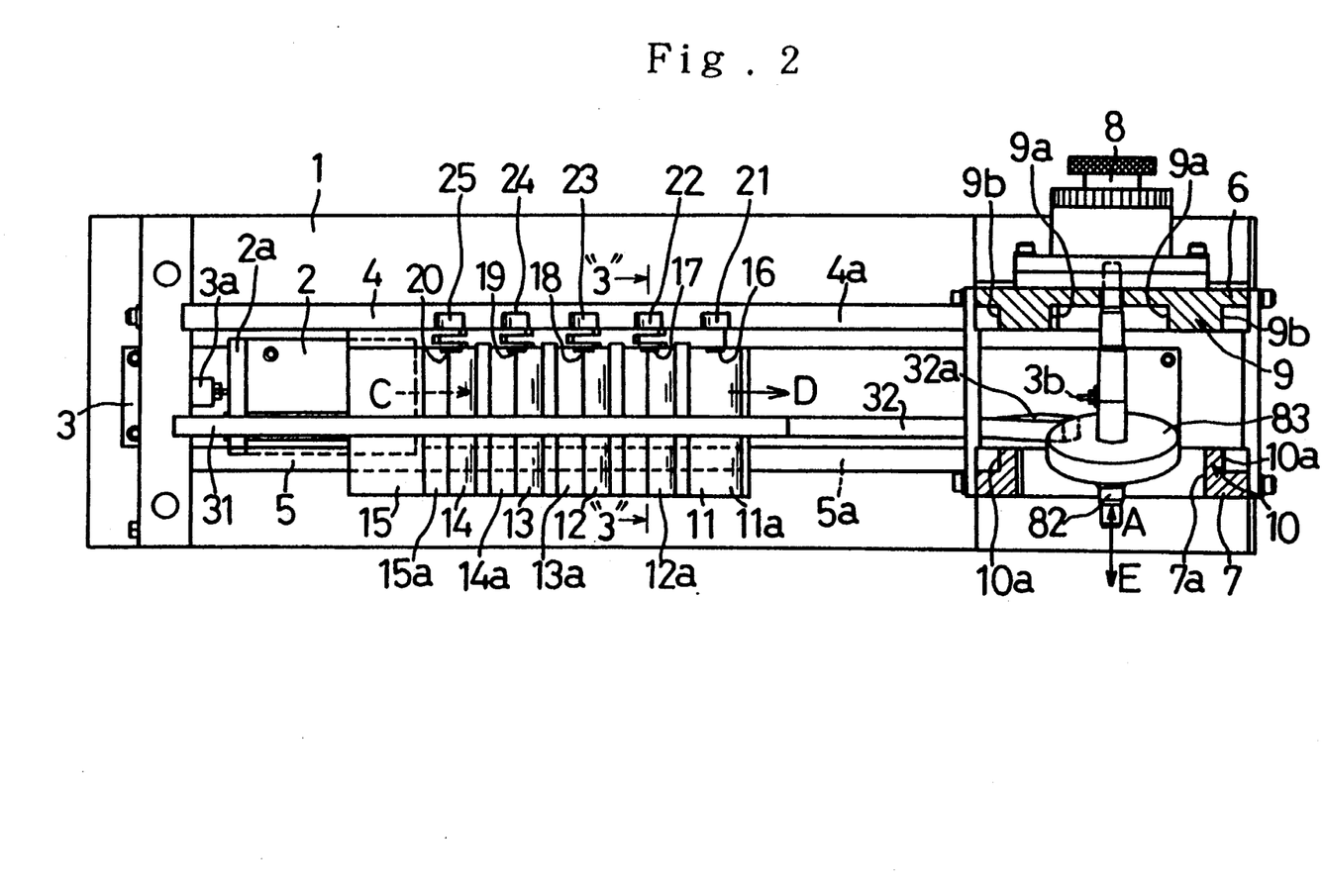
FIG. 2 is a plan view of the Preferred Embodiment of the present assembly apparatus partly taken in cross-section.

As illustrated in FIGS. 1 and 2, the present assembly apparatus is adapted to assemble the sub-assembly of the double-headed swash plate type compressor provided with 5 cylinders on each of the sides. Please note, however, that the pistons 81, and the like, are not illustrated in FIG. 2.

The present assembly apparatus is provided with an elongated movable plate 1 to which a rod-less cylinder 3 is installed. The rod-less cylinder 3 is provided with a slider 2 which is adapted to slide on the top surface from one end to the other end in the lengthwise direction, and it is also provided with pins 3a and 3b for positioning the slider 2 at the ends. The rod-less cylinder 3 and the slider 2 are adapted to operate as the transporting means.

Figure 3:
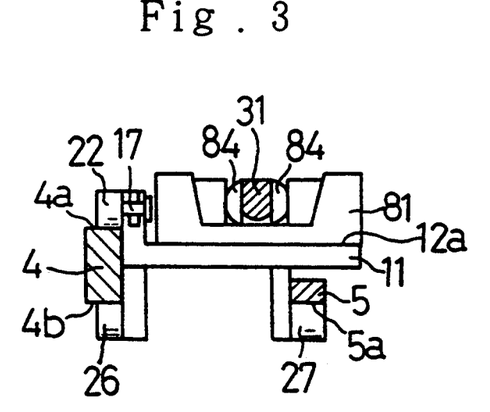
FIG. 3 is a cross-sectional view of the Preferred Embodiment of the present assembly apparatus taken along the line "3"—"3" of FIGS. 1 and 2.

As illustrated in FIG. 2, a first horizontal rail 4 and a second horizontal rail 5 are disposed above the rod-less cylinder 3, and they are joined to a pillar which is erected at an end of the movable plate 1. Further, the first horizontal rail 4 and the second horizontal rail 5 are extended in parallel in the sliding direction of the slider 2. Furthermore, as illustrated in FIG. 3, the top surface of the first horizontal rail 4 is a flat guide surface 4a, and the bottom surface thereof is a flat guide surface 4b which is parallel to the guide surface 4a. Moreover, the bottom surface of the second horizontal rail 5 is a flat guide surface 5a which lies in a common plane with the guide surface 4b of the horizontal rail 4.

Figure 4:
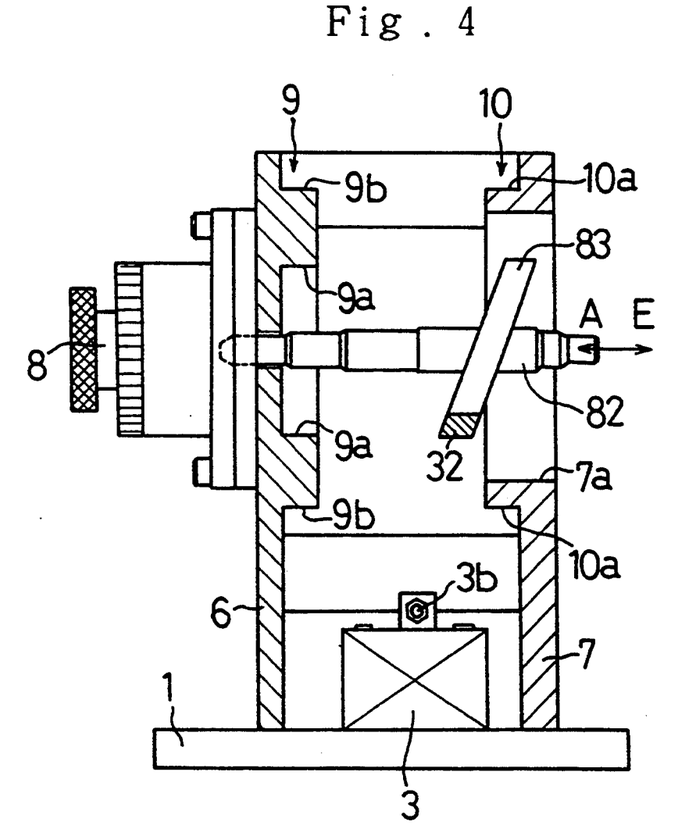
FIG. 4 is a cross-sectional view of the Preferred Embodiment of the present assembly apparatus taken along the line "4"—"4" of FIG. 1.

As illustrated in FIG. 2, at the other end of the movable plate 1, a pair of side plates 6 and 7 are disposed opposingly with the rod-less cylinder 3 between them. On the outer surface of the side plate 6, a holder 8 is disposed, and it is adapted to hold an end of the driving shaft 82 so as to disclose the driving shaft 82 horizontally. On the inner surface of the side plate 6, a first rounded (curved) rail 9 is formed projectingly. As also illustrated in FIG. 4, the first rounded rail 9 includes an inner peripheral surface 9a which is connected with the guide surface 4a of the first horizontal rail 4, and an outer peripheral surface 9b which is connected with the guide surface 4b of the first horizontal rail 4. The side plate 7 is provided with an opening 7a in the middle. On the inner surface of the side plate 7, a second rounded (curved) rail 10 is formed projectingly around the opening 7a. The second rounded rail 10 includes an outer peripheral surface 10a which is connected with the guide surface 5a of the second horizontal rail 5. Further, the opening 7a is formed in such a size that the sub-assembly can be taken out. Furthermore, the outer peripheral surfaces 9b and 10a of the first and second rounded rails 9 and 10 are extended so as to encircled an outer peripheral area of the swash plate 83 on the driving shaft 82 held by the holder 8.

As illustrated in FIGS. 1 through 3, 5 carriers 11 through 15 constituting the segmented truck are disposed in series on the first and second horizontal rails 4 and 5. Namely, in this Preferred Embodiment, the segmented truck is divided into 5 carriers 11 through 15. As can be appreciated from FIG. 3, each of the carriers 11 through 15, only carrier 11 being shown, includes a horizontal part, and a pair of vertical parts disposed perpendicularly to the horizontal part and extending down therefrom. As illustrated in FIG. 2, the carriers 11 through 15 are provided with rollers 21 through 25 which are mounted rotatably by pins 16 through 20, respectively. Turning now to FIG. 3, although FIG. 3 shows only the roller 22 and pin 17, it can be seen that the rollers 21 through 25 and the pins 16 through 20 are disposed at the upper portion on the outer side of one of the vertical parts of the carriers 11 through 15, respectively. The pins 16 through 20 are located to coincide with the center of the pistons 81 when placed on the carriers 11 through 15. Further, as illustrated in FIG. 2, the carriers 11 and 12, the carriers 12 and 13, the carriers 13 and 14, and the carriers 14 and 15 are connected articulately by the pins 17, 18, 19 and 20, respectively. The pins 17 through 20 constitute the bending or turning centers of the carriers 11 through 15.

As illustrated in FIG. 1-3, the carrier 11 is provided with a concavity 11a, which is adapted to seat the piston 81, in the horizontal part. Likewise, the carriers 12 through 15 are provided with concavities 12a through 15a, respectively, in the horizontal parts. Further, the carrier 11 is provided with a roller 26 which is mounted rotatably by a pin (not shown) at the lower portion on the outer side of one of the vertical parts and which is disposed so as to diagonally oppose the roller 21. Although FIG. 3 illustrates only the carrier 11 provided with the roller 26, the carriers 12 through 15 are similarly provided with such a roller (not shown) which is installed rotatably by a pin (not shown) at the lower portion on the outer side of one off the vertical parts and which is disposed so as to diagonally oppose the rollers 22 through 25, respectively. Furthermore, as illustrated in FIG. 1, the carriers 11 through 15 are provided with rollers 27 through 30 at the lower portion on the outer side of the other vertical part, respectively. The rollers 27 through 30 are disposed between the carriers 11 and 12, between the carriers 12 and 13, between the carriers 13 and 14, and between the carriers 14 and 15, respectively, and they are mounted rotatably on the carriers 11 through 15 by pins.

As illustrated in FIG. 2, the rollers 21 through 25 are adapted to continually rotate on the guide surface 4a of the first horizontal rail 4 and on the inner peripheral surface 9a of the first rounded curved rail 9. As can be appreciated from FIG. 3, the rollers 26 and so on are adapted to continually rotate on the guide surface 4b of the first horizontal rail 4 and on the outer peripheral surface 9b of the first rounded rail 9. As can be appreciated also from FIG. 3, the rollers 27 through 30 are adapted to continually rotate on the guide surface 5a of the second horizontal rail 5 and on the outer peripheral surface 10a of the second rounded rail 10.

As illustrated in FIG. 1, the rear of the carrier 15 is connected with the slider 2 by way of a rod 2b and a bracket 2a. Accordingly, when the slider 2 is actuated to slide on the rod-less cylinder 3, the rollers 21 through 25 roll over the guide surface 4a, the rollers 26 and so on roll over the guide surface 4b, and the rollers 27 through 30 roll over the guide surface 5a, and thereby the carriers 11 through 15 move on the First and second horizontal rails 4 and 5 in this order. Thereafter, the rollers 21 through 25 roll over the inner peripheral surface 9a, the rollers 26 and so on roll over the outer peripheral surface 9b, and the rollers 27 through 30 roll over the outer peripheral surface 10a, and thereby the carriers 11 through 15 move along the first and second rounded rails 9 and 10 in this order. Eventually, as illustrated in FIG. 1, the carriers 11 through 15 position the concavities 11a through 15a in a predetermined phaseal, i.e., circumferentially spaced, relationship in which the concavities 11a through 15a are separated from each other by 72 degrees.

Figure 5:
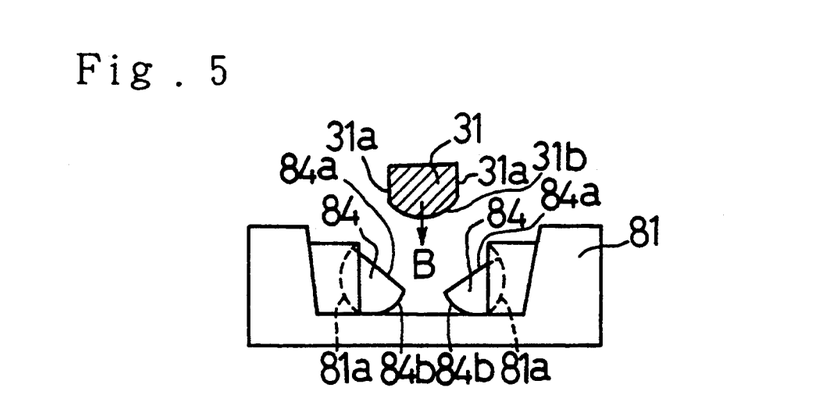
FIG. 5 is a side view of the Preferred Embodiment of the present assembly apparatus illustrating a positional relationship between a first orienting member of the present assembly apparatus and a piston and hemispherical shoes of a swash plate type fluidic apparatus before lowering the first orienting member.
Figure 6:
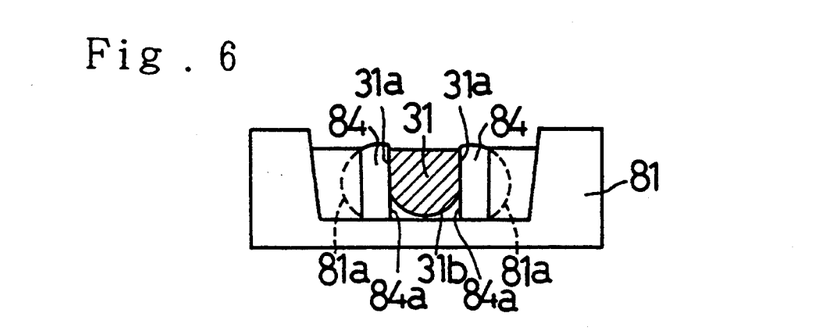
FIG. 6 is a side view of the Preferred Embodiment of the present assembly apparatus illustrating a positional relationship between the first orienting member, the piston and the shoes after lowering the first orienting member.

As illustrated in FIGS. 2 and 3, there is disposed a first orienting member 31 between the first and second horizontal rails 4 and 5. The first orienting member 31 is connected with a lifter (not shown). Accordingly, the first orienting member 31 is adapted to move vertically between a pair of the spherical seats 81a of the pistons 81 when it is lowered and when the carriers 11 through 15 are located on the first and second horizontal rails 4 and 5. As illustrated in FIGS. 5 and 6, the first orienting member 31 is provided with an arc-shaped guide surface 31b at its bottom and it has a thickness between its side surfaces 31a which is substantially equal to the thickness of the swash plate 83.

Figure 7:
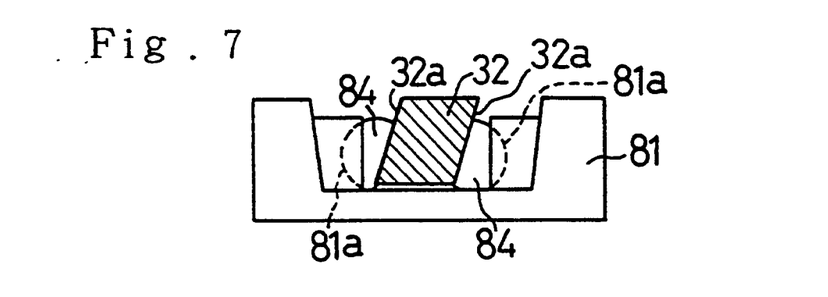
FIG. 7 is a side view of the Preferred Embodiment of the present assembly apparatus illustrating a positional relationship between a second orienting member of the present assembly apparatus, the piston and the shoes.
Figure 8:
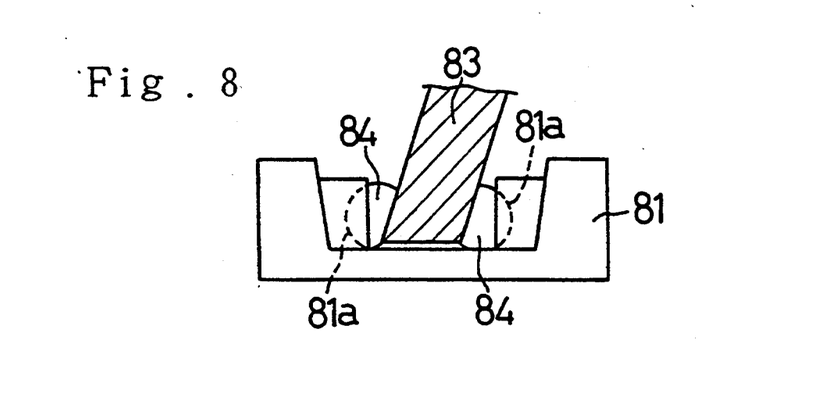
FIG. 8 is a side view of the Preferred Embodiment of the present assembly apparatus illustrating a positional relationship between the piston, the shoes and a swash plate of the swash plate type fluidic apparatus.

As illustrated in FIG. 2, when the first orienting member 31 is placed at the lowermost descending position, it is connected with a second orienting member 32. At this moment, the side surfaces 31a of the first orienting member 31 and side surfaces 32a of the second orienting member 32 are flush with each other. As illustrated in FIGS. 1, 2 and 7, the side surfaces 32a of the second orienting member 32 incline gradually to the inclination angle of the swash plate 83.

In addition, the movable plate 1 is connected with a rotating apparatus (not shown) which is adapted to rotate the entire present assembly apparatus through 90° as seen in FIG. 4 so as to direct the opening 7a of the side plate 7 upward.

The present assembly apparatus thus constructed operates as follows. As illustrated in FIG. 2, the driving shaft 82 is inserted into the space between the side plates 6 and 7 through the opening 7a in the direction of the arrow "A," and the driving shaft 82 is secured by the holder 8 at the end. On the other hand, when the bracket 2a is brought into contact with the positioning pin 3a, the pistons 81 are placed, respectively, on the concavities 11a through 15a of the carriers 11 through 15 in the condition shown in FIG. 5. Thus, the pistons 81 and the hemispherical shoes 84 can be placed easily on the carriers 11 through 15 which are disposed on the first and second horizontal rails 4 and 5. As a result, it is unnecessary for the operator to hold the pistons 81 with his hand, and it is easy to place the shoes 84 on the spherical seats 81a of the pistons 81.

Then, the lifter is actuated, and the first orienting member 31 is lowered in the direction of the arrow "B" of FIGS. 1 and 5. Accordingly, as illustrated in FIG. 5, the flat surfaces 84a of the hemispherical shoes 84 are pressed by the guide surface 31b of the first orienting member 31, and thereby the shoes 84 are rotated on the spherical seats 81a of the pistons 81. When the flat surfaces 84a are brought into contact with the side surfaces 31a, the shoes 84 are positioned in the spherical seats 81a of the pistons 81 as illustrated in FIG. 6. Hence, it is not necessary for the operator to retain the shoes 84 in the spherical seats 81a of the pistons 81 with his fingers.

While keeping the aforementioned installation state, the slider 2 is slid in the direction of the arrow "C" of FIGS. 1 and 2 by supplying air to the rod-less cylinder 3. Accordingly, the rollers 21 through 25 roll over the guide surface 4a, the rollers 26 and so on roll over the guide surface 4b, and the rollers 27 through 30 roll over the guide surface 5a, and thereby the carriers 11 through 15 move on the first and second horizontal rails 4 and 5 in this order in the direction of the arrow "D" of FIGS. 1 and 2.

When the slider 2 is slid further, the rollers 21 through 25 roll over the inner peripheral surface 9a, and the rollers 26 and so on roll over the outer peripheral surface 9b, and the rollers 27 through 30 roll over the outer peripheral surface 10a. Accordingly the carriers 11 through 15 move along the first and second rounded rails 9 and 10. When the carriers 11 through 15 are moving on the first and second rounded rails 9 and 10, the carriers 11 through 15 are prevented from Falling because the rollers 21 through 25 are opposed diagonally with respect to the rollers 26 and so on arid because they are also opposed diagonally with respect to the rollers 27 through 30. The pistons 81 and the hemispherical shoes 84 placed on the carriers 11 through 15 are also inhibited from falling because they are supported by the side surfaces 31a of the first orienting member 31. On the rails 9 and 10, the carriers 11 through 15 articulate relative to each other around the bending centers that are aligned with the centers of the pistons 81; which are thereby disposed at predetermined intervals around the swash plate 83.

When the slider 2 is brought into contact with the positioning pin 3b at the Front end, the carriers 11 through 15 are positioned around the outer peripheral area of swash plate 83 in a predetermined phaseal or equiangular relationship in which they are separated from each other by 72 degrees. During the positioning of the carriers 11 through 15, the side surfaces 32a of the second orienting member 32, which is connected with the first orienting member 31, guide the hemispherical shoes 84 smoothly between the swash plate 83 and the spherical seats 81a of the pistons 81 which are seated respectively on the carriers 11 through 15.

All in all, in the present assembly apparatus, the 5 pistons 81 as well as the 5 pairs of hemispherical shoes 84 are assembled around the swash plate 83 mounted on the driving shaft 82 in the predetermined phaseal relationship in which they are separated from each other by 72 degrees by only sliding the slider 2 on the rod-less cylinder 3. Thus, the present assembly apparatus completes the sub-assembly of a double-headed swash plate type compressor provided with 5 cylinders on each side.

Thereafter, the movable plate 1 is rotated by the rotating apparatus (not shown) so as to direct the opening 7a of the side plate 7 upward, and the end of the driving shaft 82 of the sub-assembly in released from the holder 8. The sub-assembly is taken out through the opening 7a directed upward by pulling out the driving shaft 82 at the free end in the direction of the arrow "E" of FIGS. 2 and 4. Then, the movable plate 1 is returned by the rotating apparatus so as to direct the opening 7a of the side plate 7 sideward. Finally, the lifter is actuated so as to raise the first orienting member 31 in the direction of the arrow "F" of FIG. 1, and the rod-less cylinder 3 is actuated so as to return the slider 2 back to the original position. Thus, the present assembly apparatus is prepared for the next assembling operation. The removed sub-assembly is inserted into the cylinder blocks in a subsequent process.

Thus, the present assembly apparatus enables automatic assembly of the sub-assembly of the swash plate type fluidic apparatus in an extremely short period of time. As a result, it is unnecessary for the operator to tamper with the sets of the piston 81 and the hemispherical shoes 84 and to carry out the other required operations while holding the pistons 81 with his hands, and at the same time retaining the shoes 84 in the spherical seats 81a of the pistons 81 with his fingers.

In addition, the combination of the rod-less cylinder 3 and the slider 2 is inexpensive comparatively as the transporting means, and the sub-assembly can be completed by just actuating the rod-less cylinder 3. Hence, the present assembly apparatus can reduce the overall manufacturing cost of the double-headed swash plate type piston eventually.

Having now fully described the present invention, it will be apparent to one of ordinary skill in the art that many changes and modifications can be made thereto without departing from the spirit or scope of the present invention as set forth herein including the appended claims.

What is claimed is:

1. An assembly apparatus for assembling a sub-assembly of a swash plate type fluidic apparatus in which a plurality of pistons, each including a pair of spaced apart facing spherical seats with hemispherical shoes placed between said seats, are disposed at predetermined intervals around a swash plate installed on a driving shaft with the pistons and shoes straddling the swash plate, the assembly apparatus comprising:
    a holder adapted to hold a driving shaft with a swash plate mounted thereon;
    a horizontally extending track;
    a curved track connected with said horizontally extending track and extending circumferentially around an outer peripheral area of said holder for surrounding a swash plate which is mounted on a shaft that is held by said holder;
    a segmented truck including a plurality of carriers articulately connected and adapted to position at predetermined intervals along said truck individual assemblies of a piston with a pair of said hemispherical shoes, said truck being moveable along said horizontally extending track onto said curved track for positioning said carriers with said pistons and shoes thereon in a predetermined relationship equiangularly spaced circumferentially along said curved track;
    transporting means for moving said segmented truck along said tracks;
    a first orienting member disposed for vertical movement between the spherical seats of said pistons when said truck is on said horizontally extending track, said first orienting member having orienting surfaces adapted to position said hemispherical shoes in said spherical seats upon downward movement of said first orienting member; and
    a second orienting member disposed for connecting with said first orienting member when the latter member has descended, said second orienting member having orienting surfaces that incline gradually from a vertical position to the inclination angle of said swash plate and along which said segmented truck is transported as it moves from said horizontally extending track to said curved track, said second orienting member being adapted to guide said hemispherical shoes into position between said spherical seats of said pistons and said swash plate.

2. The assembly apparatus according to claim 1, wherein said horizontally extending track includes:
    a first horizontal rail extending in a direction in which said segmented truck is moved by said transporting means, and including a top flat guide surface and a bottom flat guide surface disposed in parallel to the top flat guide surface; and
    a second horizontal rail extending in said direction, disposed in parallel to said first horizontal rail, and including a bottom flat guide surface disposed in a common plane with said bottom flat guide surface of said first horizontal rail; and
    said curved track includes:
    a first curved rail projecting from an inner surface of a first side plate erected at an end of said first horizontal rail, and including an inner peripheral surface connected with said top flat guide surface of said first horizontal rail and an outer peripheral surface connected with said bottom flat guide surface of said first horizontal rail; and
    a second curved rail projecting from an inner surface of a second side plate erected at an end of said second horizontal rail, and including an outer peripheral surface connected with said bottom flat guide surface of said second horizontal rail.

3. The assembly apparatus according to claim 2, wherein said carriers of said segmented truck include:
    a horizontal part and vertical parts;
    the horizontal part including a concavity adapted to position one of said pistons;
    one of the vertical parts being provided with a pair of rollers, one of the rollers being adapted to roll on said top flat guide surface of said first horizontal rail, and another one of the rollers being adapted to roll on said bottom flat guide surface of said first horizontal rail; and
    another one of the vertical parts being provided with a roller adapted to roll on said bottom guide surface of said second horizontal rail.

4. The assembly apparatus according to claim 1, wherein said carriers of said segmented truck are connected articulately by pins which are disposed so as to coincide with the center of the piston placed thereon.

5. The assembly apparatus according to claim 1, wherein said transporting means includes:
    a rod-less cylinder; and a slider coupled to said truck and adapted to slide on the rod-less cylinder.

6. The assembly apparatus according to claim 1, wherein said first orienting member is in the form of a bar extending in a direction in which said segmented truck is moved by said transporting means, and includes a transversely arc-shaped guide surface at the bottom and a pair of side surfaces, adapted to operate as said orienting surfaces, said side surfaces being disposed parallel to each other spaced apart a distance thickness between said side end surfaces substantially equal to the thickness of said swash plate.

7. The assembly apparatus according to claim 1, wherein said orienting surfaces of said second orienting member are disposed flush with said orienting surfaces of said first orienting member when said second orienting member is connected with said first orienting member.

* * * * *

UNITED STATES PATENT AND TRADEMARK OFFICE
CERTIFICATE OF CORRECTION

PATENT NO. : 5,369,878
DATED : December 6, 1994  Page 1 of 2
INVENTOR(S) : K. Tsuji et al It is certified that error appears in the above-indentified patent and that said Letters Patent is hereby corrected as shown below:

Title page, item [57], col. 2,
In the Abstract, line 10, "postioned" should read --position--;

Column 1, line 37 after "disposed" insert --in--.

Column 4, line 14, after "with" delete comma ",";
line 57, after "1." change period to semi-colon --;--.

Column 6, line 14, "encircled" should read --encircle--;
line 42, "FIG." should read --FIGS.--; line 54, change "installed" to --mounted--.

Column 7, line 1, insert parenthesis around "curved";
line 40, after "bottom" insert comma --,--.

Column 8, line 38, "arid" should read --and--;
line 47, after "81" delete semi-colon ";".

UNITED STATES PATENT AND TRADEMARK OFFICE
CERTIFICATE OF CORRECTION

PATENT NO. : 5,369,878
DATED : December 6, 1994
INVENTOR(S) : K. Tsuji et al

It is certified that error appears in the above-indentified patent and that said Letters Patent is hereby corrected as shown below:

Column 10, line 52, before "position" insert --seat and--.

Column 11, line 7, after "bottom" insert comma --,--;
 line 10 delete "thickness".

Column 12, line 1, delete "between said side end surfaces".

Signed and Sealed this

Eleventh Day of July, 1995

Attest:

BRUCE LEHMAN

Attesting Officer        Commissioner of Patents and Trademarks